United States Patent Office 3,095,124
Patented June 25, 1963

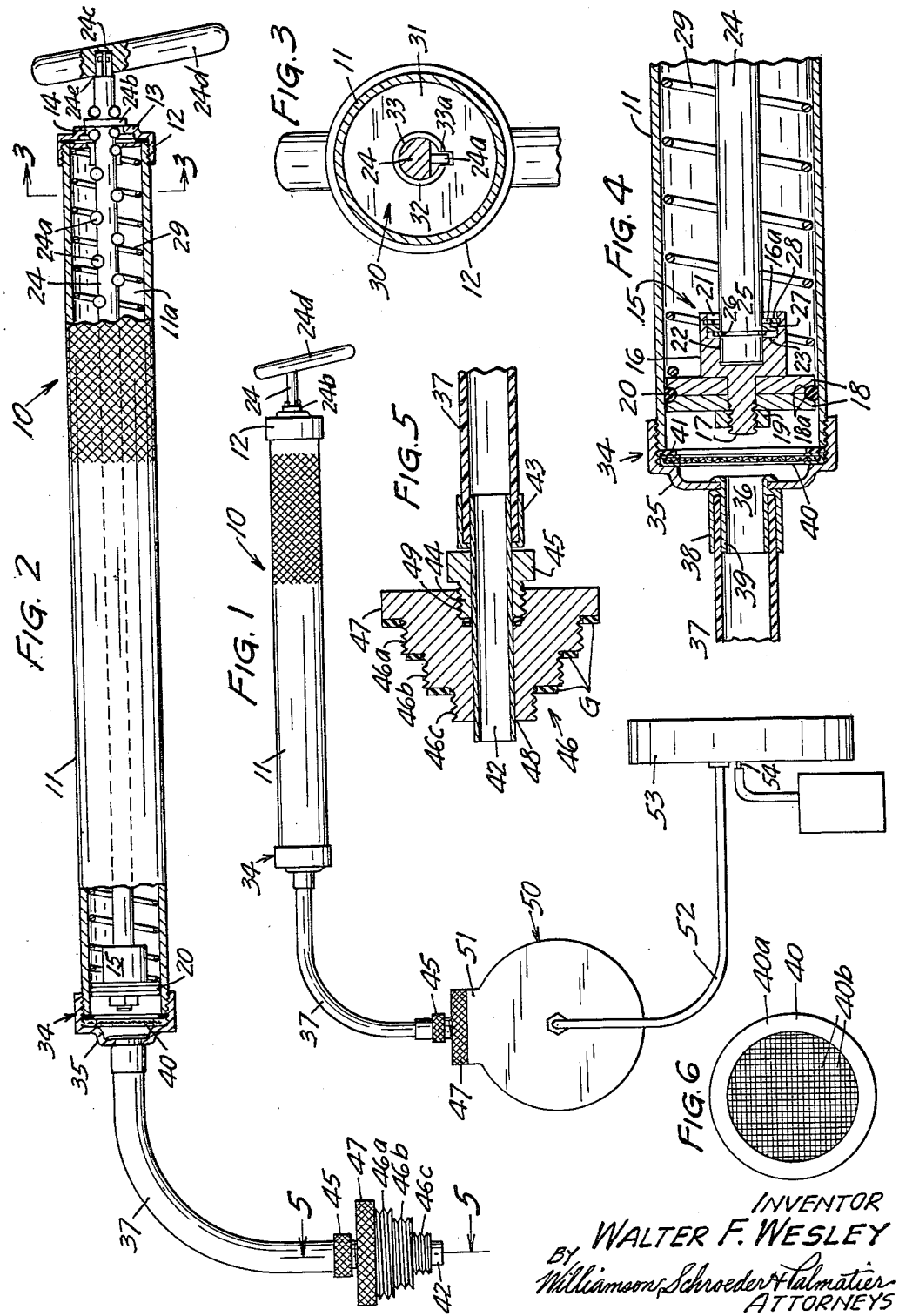

3,095,124
BLEEDING APPARATUS FOR HYDRAULIC
BRAKE SYSTEMS
Walter F. Wesley, 2410 Garfield Ave. S.,
Minneapolis, Minn.
Filed Mar. 9, 1960, Ser. No. 13,828
2 Claims. (Cl. 222—189)

This invention relates to apparatus for use with hydraulic brake systems and more specifically to apparatus for bleeding hydraulic brake systems.

An object of this invention is to provide a novel and improved apparatus, of simple and inexpensive construction, for quickly and efficiently bleeding hydraulic brake systems.

Another object of this invention is to provide a novel brake-fluid bleeding apparatus which includes a brake fluid reservoir having a spring urged piston arranged and constructed to be locked in a retracted position with respect to the brake fluid reservoir and which is releasable to progressively force brake fluid from the reservoir into a hydraulic brake system.

Another object of this invention is to provide a piston actuated apparatus for bleeding hydraulic brake systems and including a perforated fluid restrictor member positioned adjacent the discharge end of the apparatus and which is arranged and constructed to cooperate with the surface tension of the brake fluid to preclude the flow of brake fluid therethrough in the absence of external pressure.

A more specific object of this invention is to provide a fluid pressure hand tool for bleeding hydraulic brake systems, the hand tool including a dicharge tube provided with an adaptor mechanism readily connectible to a master brake cylinder and which is adjustable to permit equalization of atmospheric pressure inside and outside of the master cylinder so that the overflow of brake fluid from the master cylinder reservoir is precluded when excess brake fluid is withdrawn from such a master cylinder.

These and other objects and advantages of this invention will more fully appear from the following description, made in connection with the accompanying drawings, wherein like reference characters refer to the same or similar parts throughout the several views, and in which:

FIG. 1 is a diagrammatic view of a hydraulic brake system with the novel bleeding apparatus shown connected thereto;

FIG. 2 is an enlarged elevational view of the novel bleeding apparatus with parts thereof broken away for clarity;

FIG. 3 is a cross sectional view taken on line 3—3 of FIG. 2 and looking in the direction of the arrows;

FIG. 4 is an enlarged detail sectional view of the lower portion of the novel bleeding apparatus; and FIG. 5 is a longitudinal section of the adaptor and flexible tube taken on line 5—5 of FIG. 2 and looking in the direction of the arrows; and FIG. 6 is a top plan view of the fluid restrictor element.

As illustrated in the accompanying drawings, an embodiment of the present invention is shown. Referring now to FIG. 2, it will be seen that the novel bleeding apparatus, generally designated as 10, includes an elongate cylindrical member 11 which may be formed of any suitable metallic material such as low carbon steel welded seam tubing. It will be noted that the respective ends of cylindrical member 11 are externally threaded and that the interior of cylindrical member 11 defines a brake fluid reservoir 11a which has a capacity of seven to eight ounces of brake fluid when completely filled. An internally threaded cap 12 is detachably secured to the upper end of cylindrical member 11 and, of course, forms a closure for that end of the cylinder, Cap 12 is provided with a centrally located embossed portion 13 having an aperture 14 formed therein which is disposed in co-axial relation with respect to the axis of cylindrical member 11 as best seen in FIG. 2.

Referring now to FIG. 4, it will be seen that cylindrical member 11 is provided with a piston 15 which is disposed therein and which is axially movable of cylindrical member 11. Piston 15 includes a socket member 16 having an elongate threaded stem 17 extending axially from the lower end thereof. Elongate stem 17 extends through a pair of apertured plungers 18 which are disposed in opposed abutting relationship and which are locked against the end of socket member 16 by a lock nut 19 as best seen in FIG. 4. It will be noted that the peripheral edges of plungers 18 are cut away or beveled in a manner such that the plungers define a notch 18a when disposed in opposed abutting relationship. An annular member 20 formed of resilient compressible material such as rubber or the like is disposed within notch 18a and forms a fluid seal with the inner circumferential wall surfaces of elongate cylindrical member 11.

Socket member 16, which is substantially circular in cross sectional shape, is provided with a socket 21 terminating in a reduced portion 22. It will be noted that socket 21 and reduced portion 22 cooperate to define an annular shoulder 23. An elongate piston rod 24 has an annular groove 25 formed therein adjacent the lower end thereof and a retaining ring 26 is positioned within groove 25 as best seen in FIG. 4. The lower end portion of rod 24 is positioned within the reduced portion 22 of socket 21 so that the retaining ring 26 engages shoulder 23. An annular spacing ring 27 is disposed in co-axial relation upon rod 24 and has its upper annular surface engaging a retaining ring clip 28 which is secured within an annular groove 16a of socket 22. Rod 24 is free to rotate relative to socket member 16 but is retained against axial movement relative thereto by retaining rings 26 and 28 respectively.

Referring now to FIG. 2, it will be seen that piston rod 24 is positioned in co-axial relation within cylindrical member 11 and extends through aperture 14 of cap 12 and terminates in an end portion 24c. A hand grip or handle 24d is provided with a recess 24e which receives the end portion 24c of rod 24 and the handle and rod are thereafter fixedly connected together by a punch operation. Thus it will be seen that rod 24 is retractably and extensibly movable through aperture 14 and serves to move piston 15 axially of cylindrical member 11.

Referring now to FIGS. 2 and 3, it will be seen that the greater length of piston rod 24 is provided with a plurality of lugs 24a which extend outwardly from the periphery of the rod and are longitudinally spaced therealong. In the preferred form, lugs 24a are formed integrally with the material of the rod 24 by a pinch action and it will be noticed that lugs 24a are arranged in a pair of longitudinally extending rows along the piston rod with the lugs of one row being staggered relative to the lugs of the other row. Aperture 14 of upper end cap member 12 is shaped to permit piston rod 24 to pass therethrough and when piston rod 24 is rotated, one of the lugs 24a will engage the outer surface of cap 12 to thereby retain piston rod 24 in a retracted position. When piston rod 24 is in such a retracted position, it may be released by rotating the rod until lugs 24a are aligned with the correspondingly shaped open portion of aperture 14 and the piston rod will thereafter be in the position for axial extensible and retractable movement.

Means are also provided for urging piston 15 axially away from cap 12 and in the preferred embodiment includes a pre-loaded coil spring 29 which bears against the uppermost of plungers 18. It has been found that spring 29 exerts a torque or twist on piston rod 24 of a magnitude to cause rod 24 to actually twist. This is especially true when spring 29 is compressed and the twisting effect on rod 24 is sufficient in some instances to cause the rod to twist into locking engagement with cap 12.

This accidental locking of piston rod 24 during extensible movement of the piston rod into the cylindrical member 11, of course, interferes with the bleeding operation and this problem is completely precluded by the rotatable connection between the piston rod 24 and the piston 15. The twist or torque exerted on the piston 15 will cause piston 15 to rotate relative to rod 24 so the predetermined position of rod 24 with respect to the apertures in cap member 12 is maintained. The rod 24 is also free to rotate relative to the piston 15 for locking and unlocking the rod in a retracted position. Because of the uniquely constructed piston 15, the rotation of rod 24 may be accomplished with only slight effort.

In some instances, especially when the bleeding apparatus 10 is disposed in a horizontal position, the offset hand grip or handle 24d will actually cause the rod to rotate by action of gravity. To avoid this accidental rotation of rod 24, I have provided a uniquely constructed lock retaining and guiding member 30. Lock retaining and guiding member 30 includes a substantially flat circular portion 31 having a centrally located sleeve 32 integrally formed therewith. Circular portion 31 of member 30 is of a size to fit somewhat snugly within cylinder 11 and is positioned and retained against the inner surface of cap member 12 by spring 29 as best seen in FIG. 2. Referring now to FIG. 3, it will be seen that the opening 33 in sleeve 32 corresponds to the shape and size of aperture 14 in cap member 12. It will also be noted that opposite sides of sleeve 32 are provided with axially extending notches 33a while the opening in circular portion 31 is correspondingly shaped so that lugs 24 may pass through the lock retaining and guiding member 30. The spacing between the lugs 24a and the length of member 30 is such that one of the lugs is positioned within the guiding member 30 at all times during axial movement of the rod. The coil spring 29 exerts a force against guiding member 30 so that accidental rotation thereof is prevented because of the cooperative relationship of the lugs 24 within the slots or notches 33a of the guiding member unless the handle or hand grip 24d is manually turned. It will also be noted that the spacing between oppoistely adjacent lugs 24a and the axial dimension of embossed portion 13 of the cap member is such that the guiding distance between the respective staggered lugs is so small that there is little chance of the piston rod being freely or accidentally rotated.

Stop means are also provided on piston rod 24 to limit extensible movement of the rod into cylinder 11 and include an annular member 24b secured to rod 24 between longitudinally spaced lugs 24f which are also formed integrally with the piston rod adjacent handle rod 26. Stop member 24b, of course, engages embossed portion 13 so that further extensible movement of the rod into cylinder 11 is limited and it will be noted that when the rod is in this position, piston 15 is spaced axially from the opposite end of the cylinder.

Referring now to FIG. 4, it will be seen that the lower threaded end of cylinder 11 is closed by an internally threaded lower end cap 34 terminating downwardly in a generally truncated conical portion 35 having a fluid outlet 36 formed therein. An elongate flexible tubular member 37 is connected to the truncated conical portion 35 of cap 34 and is in communicating relation with fluid outlet 36 and brake fluid reservoir 37a as best seen in FIG. 4. Tubular member 37, which in the preferred embodiment, is formed of a transparent plastic material, is sealingly clamped between a pair of metallic sleeves 38 and 39 respectively and it will be noted that the innermost of sleeve 39 extends through fluid outlet 36 and is sealingly connected to truncated conical portion 35 as is clearly seen in FIG. 4.

Means are also provided for restricting the flow of hydraulic brake fluid through fluid outlet 36 in the absence of external pressure and includes a perforate member 40 which, as best seen in FIG. 4, extends across the fluid outlet. In the preferred embodiment, perforate member 40 is formed of mesh material and is generally circular in shape with the peripheral edges thereof being received within a metallic annular member 40a which has a substantially U-shaped cross sectional configuration. Referring again to FIG. 4, it will be seen that perforate member 40 is positioned within cap member 34 with the end of cylinder 11 bearing against the annular element 40a. A gasket or washer 41 is interposed between perforate member 40 and the end of cylinder 11 and serves to form a fluid seal.

Although the viscosity of brake fluids will vary slightly, the perforations or openings 40b of perforate member 40 are sufficiently small in size such that the surface tension of the hydraulic fluid will cooperate therewith and prevent the flow of brake fluid therethrough in the absence of external pressure. It has been found that the diameter of the opening or in the case of mesh material, the width of the opening be not larger than .015 inch and not smaller than .010 inch. If the width of the openings 40b are less than .010 of an inch, the perforate member will unduly restrict the flow of fluid therethrough and if the width of the openings are larger than .015 of an inch then jarring of the cylinder will cause the fluid to pass through the perforate member. In the preferred embodiment, the width of the opening is .015 of an inch and the perforate member serves to restrict the flow of fluid therethrough in the absence of external pressure even when the bleeding apparatus is accidentally jarred. The particular mesh size may be forty mesh with the diameter size being .010 of an inch with the mesh having a 36% open area and the width of each opening being .015 of an inch. However, the width of the opening of the mesh material must be between .010 of an inch and .015 of an inch.

Referring now to FIG. 5, it will be seen that the free end portion of tubular member 37 is provided with an elongate metallic sleeve inserted therein and extending axially therefrom. Sleeve 42 is clamped in sealing relation within tube 37 by an external metallic sleeve 43 and forms an extension of tubular member 37. An externally threaded sleeve-like fitting 44 is rotatably mounted in co-axial relation upon sleeve 42 and is provided with an enlarged annular finger-grip portion 45, as best seen in FIG. 5. Axial movement of male fitting element 44 is limited by an annular stop 46 which is affixed to sleeve 42 and upward axial movement is limited by the inwardly turned ends of external sleeve 43.

An adaptor or coupling member 46 includes a plurality of co-axially reduced externally threaded portions 46a, 46b and 46c respectively which extend axially from the finger-grip portion 47 thereof. Adaptor or coupling member 46 is provided with a bore 48 terminating upwardly in an enlarged internally threaded socket 49 in which male fitting element 44 is sealingly received. The co-axial and externally threaded portions 46a, 46b and 46c of coupling member 46 permit the coupling member to be used or attached with any conventional master brake cylinder with the exception of the brake cylinder used in the Chrysler products.

When it is desirable to bleed the air bubbles from a hydraulic brake system after the brake system has been filled, the free end of the bleeder apparatus with the coupling member 46 removed therefrom is inserted into a container of brake fluid and piston rod 24 is retracted unitl the brake fluid reservoir 11a is completely filled and piston rod 24 is thereafter rotated so that it is locked in a retracted position. The closure cap for the filler opening in the brake fluid reservoir 51 of a master brake cylinder 50 is removed and coupling member 46 is connected thereto. A rubber gasket or washer G, as best seen in FIG. 5, may be positioned against the axially facing surface of one of the axially reduced portions of coupling member 46 so that a fluid seal is effected between a brake fluid reservoir and the coupling member. Sleeve 42 is then inserted into the bore 48 of coupling member 46 and male fitting element 44 is connected in sealing relation into the internally threaded socket 49. It should be noted that when bleeding apparatus 10 is filled and the piston rod 24 is held in a retracted position, the brake fluid within brake fluid reservoir 11a will be retained therein by perforated member 40 and the brake fluid within tubular member 37 will flow therefrom back into the brake fluid container. After male fitting element 44 is sealingly secured within socket 49, handle 26 is rotated to release the piston rod 24 from its retracted position, and spring 29 will urge piston 15 towards fluid outlet 36 so that piston pressure will be applied to the brake fluid within the cylinder. Portions of the column of air in flexible tube 37 will be forced into the master cylinder reservoir 51 but will immediately rise to the surface thereof since the pressure exerted by bleeder apparatus 10 is insufficient to force this air out through the conduits 52 into the brake drums 53. As the brake fluid is forced out through the brake fluid conduits 52 the user merely opens the bleeder valves 54 of the brake drums 53 to permit a small quantity of fluid to escape along with the air bubbles. This excess fluid may be allowed to flow into a container for subsequent use and the valve is thereafter closed. The remaining brake drums are similarly bled during which time piston 15 is constantly urging fluid through the brake fluid outlet 36 and, of course, exerting fluid pressure on the system. It has been found that not more than seven or eight ounces of fluid is needed in the bleeding operation of automobiles and at the completion of the bleeding operation, the master cylinder will also be filled to its capacity. In order to avoid overflow and waste of brake fluid from the master brake cylinder, a certain amount of brake fluid is withdrawn from the master cylinder into the bleeder apparatus. When the fluid is withdrawn into the bleeding apparatus 10, a negative pressure or partial vacuum is created in the master cylinder reservoir with the resulting effect that the fluid within flexible tubular member 37 is retained therein. By slightly turning male fitting element 44 in a direction to loosen the same, the fluid sealing relation between the coupling member 46 and male fitting element 44 is broken and air will flow into the master cylinder reservoir thereby permitting the fluid within flexible tubular member 37 to enter the master cylinder reservoir.

It will therefore be seen that coupling member 46 and male fitting element 44 form a uniquely arranged coupling attachment which is adjustable to prevent overflow of the brake fluid at the end of the bleeding operation thereby effecting a saving of brake fluid.

It will be seen from the preceding paragraphs that I have provided a novel bleeding apparatus which is of a size for ready handling thereof and whch is arranged and constructed to permit one person to quickly and efficiently bleed a hydraulic brake system. It will also be noted from the foregoing description that my novel bleeding apparatus is comprised of relatively few parts so that the danger of malfunctioning of the apparatus is greatly minimized. The piston rod, as noted from the above description, is arranged to be positively locked in a retracted position while extensible movement of the piston within the cylinder is insured by the uniquely constructed guiding member.

It will also be noted that I have provided a novel bleeding apparatus which includes a fluid restrictor member arranged and constructed to prevent the flow of fluid therethrough in the absence of external pressure but allowing fluid to flow therethrough when piston pressure is applied to the brake fluid within the reservoir. It will further be noted that I have provided a novel coupling attachment to permit the bleeder apparatus to be effectively connected to a master brake cylinder and which is adjustable to permit equalization of atmospheric pressure within and without the master cylinder reservoir at the end of the bleeding operation so that the danger of the brake fluid overflowing is precluded.

It will, of course, be understood that various changes may be made in the form, details, arrangement and proportions of the parts without departing from the scope of this invention which consists of the matter shown and described herein and set forth in the appended claims.

What is claimed is:

1. A brake bleeding apparatus for use in applying even and constant hydraulic pressure to a hydraulic brake system during a brake bleeding operation, said apparatus comprising an elongate cylindrical member defining a brake fluid reservoir therewithin and having a fluid outlet at one end thereof and having an aperture at the other end thereof, a piston positioned within said cylindrical member for axial movement relative thereto, an elongate piston rod having one end thereof rotatably secured to said piston for rotation relative thereto and having the other end thereof extending through the aperture in said other end of the cylindrical member, said rod being extensibly and retractably movable through said aperture for moving said piston axially of said cylindrical member, resilient means urging said piston towards said one end whereby piston pressure will be applied to brake fluid within said reservoir, cooperating retaining elements on said rod and cylindrical member respectively being engageable with each other for retaining said rod in a selected one of a plurality of adjusted positions and said retaining elements being readily disengageable to permit said piston to be moved toward said one end under the influence of said resilent means, an elongate flexible tubular member having one end thereof connected to said cylindrical member in uninterrupted communication with said fluid outlet and having coupling means at the other end thereof for ready connection to the inlet of a master brake cylinder, and a perforate member disposed across said fluid outlet and having perforations therein sufficiently small in size such that the surface tension of the hydraulic brake fluid will cooperate therewith and being the sole means to preclude the flow of fluid therethrough in absence of external pressure.

2. Brake bleeding apparatus for use in applying even and constant hydraulic pressure to hydraulic brake systems during the brake bleeding operation, said apparatus comprising an elongate cylindrical member defining a brake fluid reservoir therewithin and having a fluid outlet at one end thereof and having an aperture in the other end thereof, an elongate flexible tubular member having one end thereof connected to said one end of the cylindrical member in uninterrupted fluid communication with said fluid outlet and having coupling means carried by the other end thereof readily connectible to the inlet of a master brake cylinder, a perforate member constructed of mesh material being disposed across the outlet, the width of each perforation being between .010 and .015 of an inch, said perforate member cooperating with the surface tension of the hydraulic fluid within the cylindrical member and being the sole means to preclude the flow of fluid therethrough in the absence of external pressure, a piston positioned within said cylinder for axial movement relative thereto, an elongate piston rod having one end thereof rotatably connected to said piston for rotation relative thereto and having the other end thereof extending through said aperture, said rod being extensibly and retractably movable through said aperture for moving said piston axially of said cylindrical member, resilient means for urging said piston towards said one end of the cylindrical member whereby piston pressure will be applied to said brake fluid within the reservoir, means for releasably locking said rod in a selected retracted position against the influence of said resilient means including the plurality of lugs arranged in a pair of longitudinally extending rows along the rod and extending outwardly from the periphery thereof, the lugs of one row being centered relative to the lugs in the other row, said rod being normally oriented to permit said lugs to pass through said apertures during extension and retraction of the rod and being rotatable to selectively position a lug into engaging relation with said other end of the cylindrical member to thereby releasably lock said rod in a retracted position.

References Cited in the file of this patent
UNITED STATES PATENTS

| | | |
|---|---|---|
| 939,198 | Allen | Nov. 9, 1909 |
| 994,441 | Burke | June 6, 1911 |
| 1,642,940 | Bystricky | Sept. 20, 1927 |
| 1,689,186 | Zabriskie | Oct. 23, 1928 |
| 1,776,095 | Albertine | Sept. 16, 1930 |
| 2,181,073 | Schafer et al. | Nov. 21, 1939 |
| 2,504,683 | Harnley | Apr. 18, 1950 |
| 2,717,724 | Martin | Sept. 13, 1955 |
| 2,872,951 | Wilkerson | Feb. 10, 1959 |